July 2, 1968  E. J. McARDLE  3,390,618

METHOD OF LINING PAPER CUPS WITH PLASTIC FILM

Filed Sept. 30, 1965  2 Sheets-Sheet 1

Inventor:
Edward J. McArdle,
By Walter H. Beland
agent.

Inventor:
Edward J. McArdle,
By Walter H. Beland
agent 3,390,618
METHOD OF LINING PAPER CUPS WITH PLASTIC FILM
Edward J. McArdle, Morton Grove, Ill., assignor to Continental Can Company, Inc., New York, N.Y., a corporation of New York
Filed Sept. 30, 1965, Ser. No. 491,701
4 Claims. (Cl. 93—36.01)

ABSTRACT OF THE DISCLOSURE

A method of lining paper containers such as cups and tubs with plastic film. The film is placed across the mouth of the container, is then heated and sealed to the container mouth rim. The air is then evacuated from the container solely through the hook seam joining the container side wall and bottom wall, resulting in the plastic film being drawn down into the container into contact with the interior container wall to form a plastic liner.

---

This invention primarily relates to the art of manufacturing paper containers such as paper cups and tubs for liquid and paste-type products. More specifically, the invention relates to lining such containers with plastic film material in order to insure that the contents of the container will not be able to leak out and to prevent the paper from which the container is formed from becoming soggy and weak as a result of an exposure to the contents.

In the past, such containers have been made serviceable by coating at least the interior surfaces with a wax so as to render the interior of the container moisture proof. Such wax coatings have disadvantages. One disadvantage is that wax coatings are relatively expensive. Another disadvantage is that the wax comes off when the contents is of the paste type and is removed with a knife, fork, or spoon, whenever the tool contacts the inner surface of the container. Still another disadvantage is that some products are hot filled into the container which would result in the melting of the wax coating, therefore making such coating impractical for use with such a product.

In order to overcome these disadvantages of the wax coated paper containers, the paper stock from which such containers were to be fabricated was provided on one side thereof with a film of plastic material such as polyethylene heat and pressure bonded thereto. Container body blanks were then subsequently cut from the sheet material and formed about a round mandrel with the polyethylene coating on the inside in the usual manner so as to bring opposite cut ends of the blank into slight overlapping relationship so as to form an adhesively bonded side seam extending in an axial direction along the container side wall. The inner edge forming the side seam, however, was an uncoated edge through which, if it were left uncoated, the contents of the container would eventually penetrate resulting in either a leaky container, an unsightly weakened container, or both. Also with such containers, if the bottom hook seam joining the container body wall with the bottom panel or wall, contained voids in the adhesive used to effect the seal, there could result a leaking of the contents of the container through the hook seam.

In order to provide a paper container not having any of the above mentioned problems the prior art contemplated placing a flat sheet of thermoplastic film material across the mouth of the container and sealing the film material to the usual curled mouth edge. The plastic film was then heated to soften it and vacuum was drawn in the interior of the container by subjecting substantially the entire side wall and/or bottom panel of the container to a source of vacuum. The air in the container passed through the porous paper, and the stretchable plastic film under the influence of atmospheric pressure was forced down into the evacuated container so as to conform to the side wall and the bottom panel shapes and tightly adhere thereto. It was found that when vacuum was applied in this manner so that the air in the container could escape through substantially the entire porous container side wall and/or bottom panel that the plastic film was drawn down into the container in a manner that caused the center portion of the sheet of film to thin out too much for it to adequately protect the center bottom panel or wall of the container which this area of the film contacted. Conversely, when such a method was employed, the film material adhering to the upper side wall portion of the container, was thicker than necessary due to the fact that it was forced by air pressure into rapid engagement with the upper container side wall before any appreciable stretching of this portion of the film could take place. Such a film coating tapered rather uniformly from a maximum thickness in the area of the container mouth rim to a minimum thickness in the center bottom panel of the container. This problem was well recognized and attempts were made to overcome it. Perhaps the most commonly used method of overcoming this problem was by employing what is known in the trade as an "assist plug." The assist plug is usually mounted on a plunger above the sheet of plastic film and initially presses the film down into the interior of the container so as to stretch the film in the area along the side wall, where it normally does not stretch sufficiently, before the vacuum is applied. After the film has been so stretched by the assist plug, vacuum is applied in the usual prior art manner and the film is additionally stretched to bring it into contact with the container walls. The use of such assist plugs has several disadvantages, one being that if the assist plug stretches out the film too rapidly, there is a danger that the film will be ruptured. Another is that if the assist plug is operated slowly enough to insure that it will not rupture the film, the production rate falls off. Still another disadvantage is that the assist plug adds another step to the process.

In accordance with the present invention, all of the disadvantages connected with the coating of paper containers with wax after they have been formed or the coating of the interior surface thereof with a plastic film coating which is applied to the sheet material from which the container components are subsequently blanked out are entirely eliminated. In addition, the problem of the plastic film thinning out too much at the bottom and being too thick along the upper side wall of the container as normally occurs during the vacuum forming of a sheet of plastic film against the interior of the container is also eliminated. The desired stretching of the film along the container side wall surface as provided by using an assist plug is also achieved but without the other disadvantages that arise when an assist plug is used.

In order to achieve the objects and advantages of the invention, a preferred method may be employed which includes the steps of applying a film of heat softenable plastic material across the mouth of the container in substantially air tight relationship; heating the film to soften it and then evacuating the air from the container substantially entirely through air permeable areas in the vicinity of the juncture of the container side wall and bottom panel to effect the drawing of the film into adhering contact with the interior container wall surfaces. By employing this method of evacuating the air from the container and drawing the film into adhering contact with the container walls, it has been found that the film stretches out more in the area where it contacts the upper side wall of the container and stretches less in the area of the bottom of the container than was priorly achieved without the use of an assist plug.

In order to achieve the beneficial results of the example preferred method of the invention, a special and novel apparatus is employed. A preferred embodiment of the novel apparatus includes a lower die cavity portion into which the paper container to be interiorly coated is placed and which has a cavity side wall that closely fits against the outer side wall of the container placed therein. It further includes a knock-out pad that fits against the outer surface of the container bottom panel and within the flange formed by the hook seam of the container which provides a recessed area at the container bottom. The knock-out pad is made somewhat smaller in diameter than the diameter of the recess formed by the bottom hook seam so as to provide an annular air passage formed between the side wall of the knock-out pad and the wall formed by the inner hook of the inwardly and upwardly bent lower end of the container body wall. Heating means are provided to heat the die cavity wall in the area where it contacts the container side wall. Heating means are also provided in the knock-out pad. Passageways are provided in the die cavity portion in communication with the annular air passage surrounding the side wall of the knock-out pad which are connected to a vacuum source. The apparatus also includes a movable upper die closing portion having a lower sealing surface or face that moves vertically downwardly into sealed engagement with a flat upper peripheral surface of the lower die cavity portion that surrounds the container cavity so as to form an annulus therearound. The upper die portion has a ring-like indentation in its sealing surface that fits over the curled rim of the container and forms a thermoplastic film placed between the upper and lower die portions into sealed engagement with the container mouth curled rim. The upper die closing portion includes heating elements for heating the thermoplastic film material and also vent bores therethrough for the entrance of atmospheric air above the plastic film for forcing the softened film down into the container and into intimate contact with the container walls.

Still another advantage to be gained by employing the method and apparatus of the invention is that it is possible to form a sheet of plastic film to conform to the interior of a paper container by softening the film and applying a differential air pressure thereto even if the wall surfaces of the container were fabricated from sheet material that was coated on the exterior side with a substantially air impervious plastic film prior to the blanking out therefrom of the container components. The invention also contemplates the lining of cups and tubs formed from molded cellulosic pulp as well as fiber drums, cardboard cartons and the like.

Still other advantages and objects of the method and apparatus of the invention and variations thereof will become apparent from the following detailed description and from the drawings in which.

Figure 1:
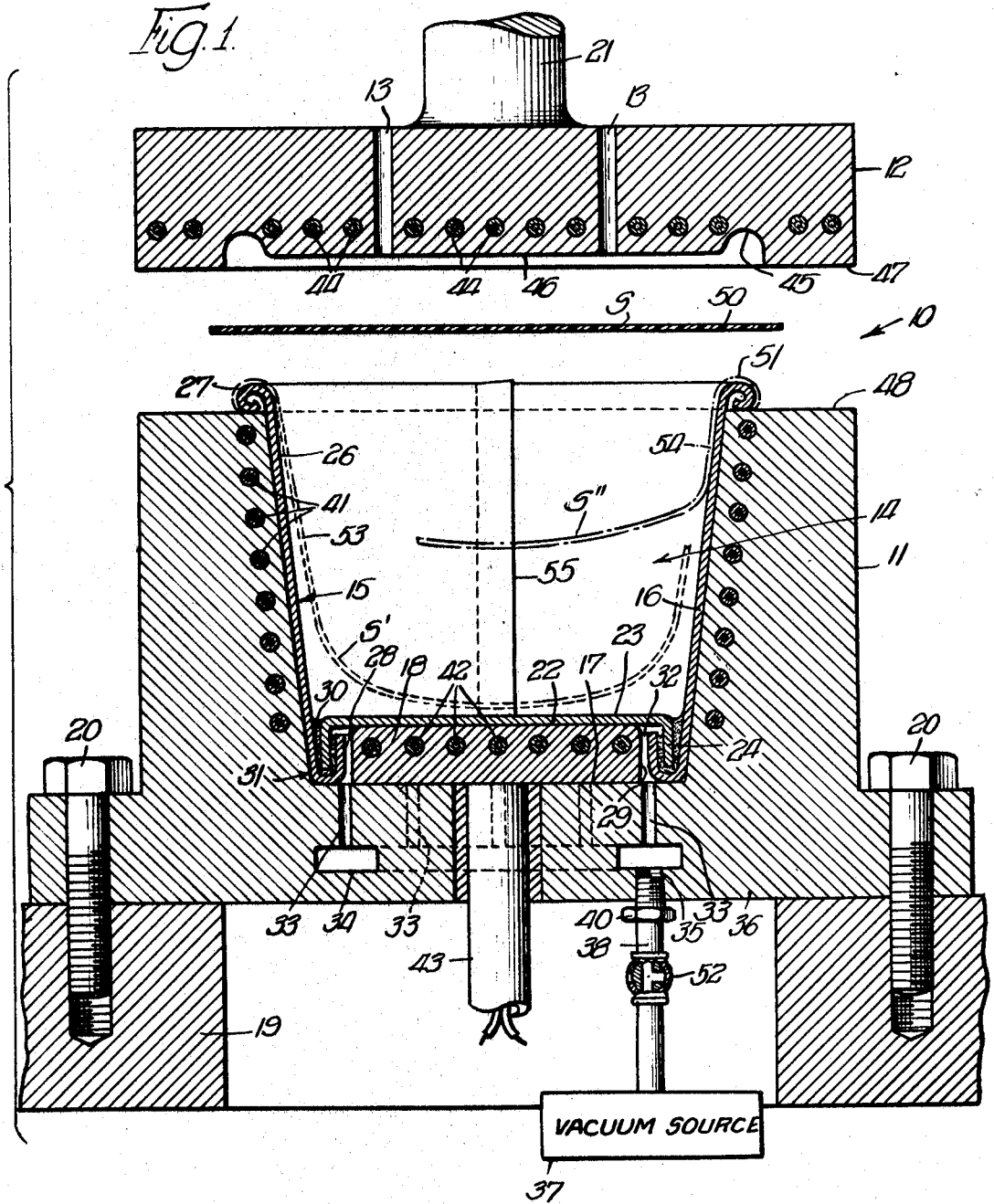
FIG. 1 depicts a preferred form of apparatus in sectional elevation.

Referring to FIG. 1 of the drawings, it will be seen that the apparatus comprises a die set generally indicated by the numeral 10. The die set 10 includes a lower cavity forming portion which is preferably fixedly mounted and which is indicated by the numeral 11. It also includes a vertically reciprocatable die closing member indicated at 12. Vent bores 13 are provided in the die closing member 12 which are positioned to be above the container receiving die cavity generally indicated at 14 in the lower cavity forming portion 11 of the die set 10. A paper container that is round in transverse cross section such as a tub for cottage cheese is shown positioned in the die cavity 14 and is indicated generally by the numeral 15. The cavity 14 includes a frusto conical side wall portion indicated at 16 and a flat horizontal bottom wall portion indicated at 17.

Vertically reciprocatably mounted in the bottom of the cavity 14 is a knock-out pad 18 that is operated in a well-known manner by means not illustrated to eject a finished container 15. The lower cavity forming portion of the die set 10 is preferably attached to the bed 19 of a press by means of a plurality of threaded fasteners such as indicated at 20. The upper vertically reciprocatable die closing member 12 has a shaft portion 21 that fits into the receiving bore in the ram of the press. It will be noted that the knock-out pad 18 has an upper flat surface 22 on which seats the bottom surface of the container bottom panel; the bottom panel being indicated at 23. The peripheral edge of the container bottom panel 23 is bent downwardly at right angles to the plane of the container bottom so as to form a peripheral flange indicated at 24. A body portion 26 of the paper container 15 forms the container side wall. A curl 27 is formed around the upper circumference of the container body 26. The lower end of the container body is curled or bent around so as to form a hook flange indicated by the numeral 28. The flanges 24 and 28 as well as the contiguous container body wall portion are adhesively bonded together by a suitable adhesive 30 best illustrated in FIGS. 2 and 3. The formed and adhesively bonded hook seam is generally referred to by the numeral 31. As will be best observed in FIGS. 2 and 3, the diameter of the knock-out pad 18 is made somewhat smaller than the distance between diametrically opposed portions of the vertical wall formed by the flange 28. This creates an annular air evacuating chamber indicated at 32 in FIGS. 2 and 3 that is formed between the opposed vertical inner peripheral wall formed by the flange 28, a vertical outer peripheral wall 29 of the knock-out pad 18 and between the bottom surface of the container bottom panel 23 and the flat bottom wall portion 17 of cavity 14. In communication with the annular air evacuating chamber 32 through the flat bottom wall portion 17 is a plurality of bores 33 preferably arranged in equally circumferentially spaced relationship and concentric with the container 15 and knock-out pad 18. The opposite end of bores 33 open into an annular chamber 34. A threaded bore 35 communicates with the annular chamber 34 through the lower wall 36 of the lower die portion 11. A vacuum source 37 is in communication with the lower end of a conduit 38 the upper end of which has a suitable threaded fitting 40 that threads into the bore 35. A vacuum condition can thus be created in the air evacuating chamber 32 by means of the passageways formed by the bores 33, the annular chamber 34, the bore 35 and the conduit 38 which connects to the vacuum source 37. Surrounding the frusto conical side wall portion of the die cavity 14 are electrical heating elements 41, the temperature of which may be regulated as desired by conventional means not illustrated. Similar electrical heating elements 42 are provided in the knock-out pad 18.

Attached to the bottom of the knock-out pad 18 is a hollow rod 43 that is capable of being vertically reciprocated in a conventional manner so as to cause a complete container 15 to be lifted by the knock-out pad 18 out of the die cavity 14 in time sequence in the operating cycle.

The upper die closing member 12 is also provided with electrical heating elements indicated at 44, the temperature of which is also controllable in a usual manner by means not shown. An annular groove 45 is provided around the outer periphery of a bottom central flat face 46 of the die closing member 12. The groove 45 terminates along its outer periphery at an annular outer wall portion 47 that lies in a plane somewhat lower than the plane of the central flat face 46. The annular wall or face 47 engages an upper flat face portion 48 of the lower cavity forming portion 11 of the die set 10. The upper flat face 48 is also annular and terminates at its inner peripheral edge at the uppper end of the frusto conical side wall portion 16 of the die cavity 14.

It is to be understood that when the upper vertically reciprocatable die closing member 12 is lowered, the annular groove 45 therein will shape the marginal edge portion 50 of a piece of plastic material S around the upper portion of the curl 27 or other desired rim configuration forming the mouth of the container 15 and effect the heat sealing of the film material to the curl or other desired mouth forming rim. The film material S may be placed across the mouth of the container 15 after the container has been placed in the die cavity 14 and before the upper vertically reciprocatable die closing member 12 is lowered. Alternatively, the sheet of film S can be adhesively tacked to the curl 27 before the container 15 is placed in the die cavity. As shown in dotted lines at 51, the formed marginal edge 50 of the plastic film S substantially covers and protects the curled mouth edge 27 of the container 15. The heaters 44 effect the heat sealing of the marginal edge 50 to the curl 27 and at the same time soften the film so as to make it easily stretchable. Once the film S has been sealed to the curl 27 and brought up to the proper temperature by the electrical heating elements 44, a suitable 3-way valve indicated at 52 in the conduit 38 is positioned so as to connect the air evacuating chamber 32 with the vacuum source 37.

Figure 2:
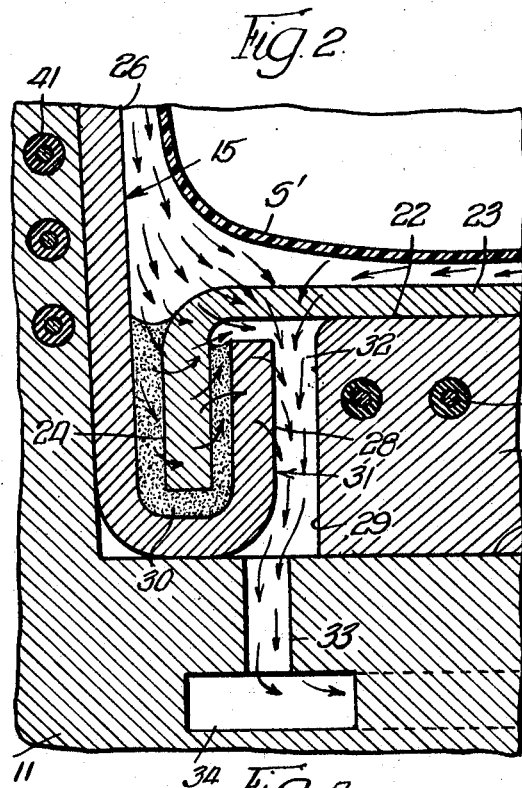
FIG. 2 shows to a greatly enlarged scale a fragmentary portion of the apparatus of FIG. 1 in the area of the hook seam at the bottom of the paper container.

This results in the air sealed off in the container 15 being evacuated through the porous material of the container substantially entirely through portions thereof that form wall portions of the air evacuation chamber 32 as best illustrated in FIG. 2 by the large number of air flow arrows. As the air flows out of the container, the air pressure is lowered therein which results in the deformation of the film S by atmospheric air pressure introduced above the firm through the bores 13. Due to the differential air pressure existing between the upper and lower surfaces of the film S, it will rapidly be forced down into the container and stretched into the configuration indicated at S' and shown in dotted lines in FIG. 1 and in solid lines in FIG. 2. It is to be noted that the film illustrated at S' has been stretched until the center portion thereof is almost in contact with the bottom panel of the container and yet that portion of the film indicated at 53 that will subsequently be forced by air pressure into contact with the container wall portion 26 is only in contact with the wall portion 26 at the upper end thereof. By virtue of the fact that the film does not contact the container side wall until it has stretched down into nearly its final shape; that is, the shape that it will be in when it is in contact with the entire interior surface of the container, the film will thin down more than usual in the area of the container side wall and will not thin out as much in the central portion thereof overlying the container bottom panel; the result being approximately that achieved when a mechanical assist plug is used to perform the initial film stretching operation.

As indicated at S" in accordance with prior art practice but without using an assist plug wherein the air in the container is permitted to be evacuated through substantially the entire side wall of the container; the bottom panel of the container; or both; it will be observed that the film contacts and adheres to the container side wall near the top thereof as indicated at 54 before the film material in this area has had an opportunity to stretch an any appreciable extent. This, of course, means that the subsequent stretching of the film S" must take place substantially in the center portion thereof making the center portion of the film undesirably thin on the bottom panel of the container and around the lower side wall portion. On the other hand, the film S" on the upper side wall portion of the container indicated at 54 is unnecessarily thick.

As the film S' contacts the inner surfaces of the container 15, it is caused to be tightly adhered thereto by means of heat sealing. The electrical heating elements 41 and 42 are set to a desired temperature for effecting the heat sealing of the film material. A temperature in the neighborhood of 180°–190° F. has been found to give satisfactory heat sealing when making tubs such as commonly used to contain cottage cheese. A portion of the heat generated in the heating elements 41 and 42 passes through the container side wall and bottom panel heating the interior surfaces thereof sufficiently to effect a heat seal.

The film material S in order to achieve the desired ecomony is preferably rather thin and may be made from a number of commercially available thermoplastic film materials, such as, for example, polypropylene or polyethylene. In order to achieve the desired heat seal at a reasonably low temperature, it is preferable that the film be coated on the side that will face the interior of the container with a suitable heat activatable material. It has been found that a clear modified synthetic resin lacquer drying by evaporation when applied to the film provides a satisfactory heat activatable adhesive. Another acceptable alternative is to employ a film material having a low softening temperature that will heat seal to the paper without the necessity of employing a separate adhesive coating. One such film forming material is an ionomer resin with a softening point of 160° F. sold under the trade name of Surlyn A by E. I. du Pont de Nemours & Co., Inc.

Once the film material has effectively been heat sealed to the container, the 3-way valve 52 is positioned so as to shut off the supply of vacuum to the air evacuating chamber 32 and simultaneously permit atmospheric air to enter through the valve, the conduit 38 and passageways 33, 34, 35 and into the air evacuating chamber 32. The release of the vacuum permits the finished container 15 to be more easily lifted by the knock-out pad 18 and removed from the die cavity 14 upon the lifting of the vertically reciprocatable die closing member 12. The film so applied to the container 15 will effectively seal the raw edge of the container side seam indicated at 55 in FIG. 1. It will also effectively seal off any crevices that may be present in the hook seam 31.

Referring back to FIG. 2 which illustrates the evacuation of the air from the interior of a container 15 that is air permeable over its entire surface prior to the application of the film S' thereto, it will be noticed that the air evacuation path arrows pass through the air permeable adhesive 30 joining the hook seam 31 together. The adhesive 30 illustrated is of the usual water soluble starch emulsion type that is normally used in the manufacture of paper cups and tubs and is not impervious to the passage of air and therefore a certain amount of the air being evacuated from the container can be expected to pass through the adhesive. The great portion of the air being evacuated, however, will pass directly through the peripheral edge portion of the container bottom panel 23 just to the left of the vertical circumferential wall 29 of the knock-out pad 18. If an air impervious adhesive is used, such as a thermoplastic resin as a binder for the hook seam 31, the evacuation of the air from the container will take somewhat longer. However, it is possible to speed up the evacuation of air by applying this type of adhesive in an interrupted pattern so that air evacuating voids are present in the hook seam between adhesively bonded areas.

Figure 3:
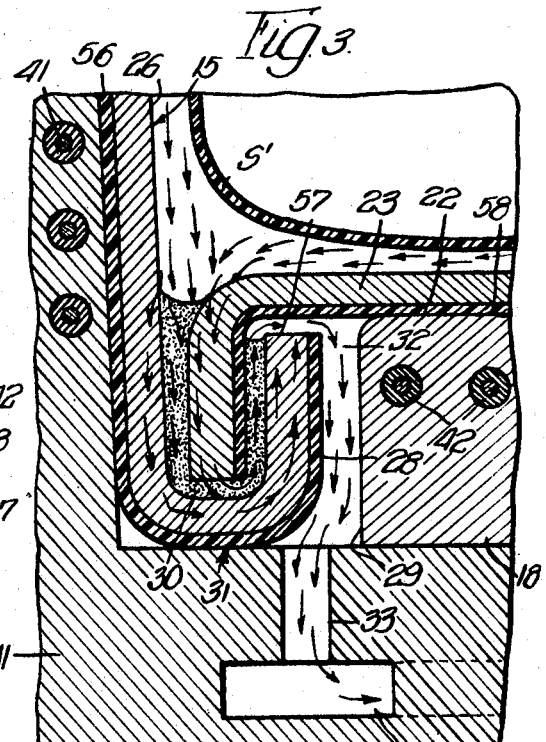
FIG. 3 is a view similar to FIG. 2 with the sole difference being that the container illustrated in this figure is exteriorly coated with plastic film material.

Referring to FIG. 3, it will be observe that here the container 15 has a coating of plastic film indicated at 56 applied to the exterior surface of the body portion 26 with the exception of the surface formed by the cut edge 57 at the terminal end of the hook flange 28. The lower outer surface of the bottom panel 23 is also coated with a similar plastic film indicated at 58. The film 56 and 58 protect the outer surfaces of the container against moisture penetration and are also substantially air impervious. In order to evacuate the air from such a container and draw the film S' into contact with the interior container walls in a commercially acceptable time, the adhesive 30 should preferably be of the usually employed air pervious type. It will be noticed by observing the air flow path arrows that all of the air being evacuated passes directly through the layers of material making up the hook seam 31 in a counter-clockwise direction. It will also be observed that the air does not pass through the film coatings 56 and 58 but only through the paper and adhesive layers of the hook seam 31. If the adhesive to be employed is an air impervious type, then, in order to achieve rapid air evacuation, the technique of applying the adhesive in an interrupted pattern so as to provide voids or channels for evacuating air through the hook seam would be resorted to. The lining film will effectively seal the voids in the hook seam against leakage of the container contents therethrough.

Since the air flow path necessary to evacuate the container 15 of FIG. 3 is much longer and more tortuous than that depicted in FIG. 2, it is to be understood that the exteriorly uncoated container depicted in FIG. 2, can be lined with the film material indicated at S' in a shorter interval of time. However, in accordance with the concept of the invention, even though the containers in each instance are evacuated through only a relatively small surface area thereof, it is still possible to draw the film material S down into the position indicated at S' and then into total contact with the interior surfaces of the container in a commercially acceptable time interval. The reason that this can be done is that the frusto conical side wall portion 16 of the die cavity 14 and the upper flat surface 22 of the knock-out pad 18 directly back up the container body portion 26 and bottom panel 23 respectively so that they cannot distort out of shape when the vacuum source 37 is communicated with the air evacuating chamber 32. This permits rapid unrestricted lowering of the air pressure in the air evacuating chamber 32 to a condition of high vacuum without fear that the container will be distorted and/or weakened.

It is not thoroughly understood why, when the air is evacuated from the containers in the manner just described that the plastic film material S will be drawn down into the configuration indicated at S' in the desired manner that was heretofore only achieved by the employment of an assist plug. Apparently, the air flow pattern set up in the container when the air is being evacuated exclusively through wall portions in the vicinity of the junction of the side and bottom container walls causes the film to be drawn down in the desired manner.

Figure 4:
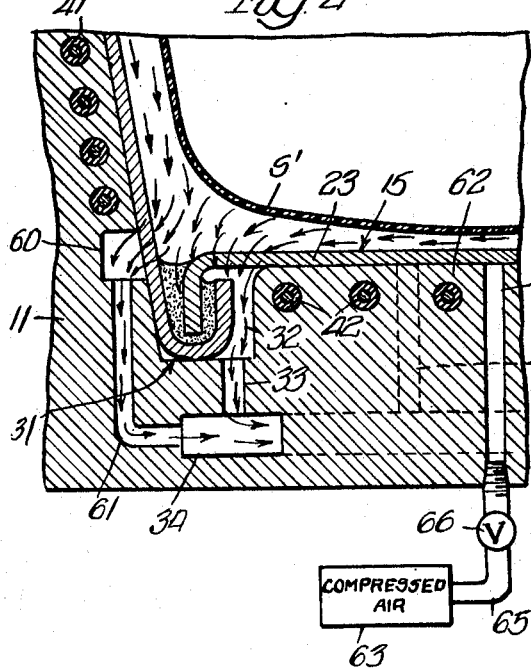
FIG. 4 is a view similar to FIGS. 2 and 3 of a somewhat modified apparatus; and, FIG. 5 is a view like FIG. 4 of still another modification.

In order to achieve even more rapid air evacuation than can be obtained in the FIGS. 1 and 2 illustration, the variation shown in FIG. 4 may be resorted to. In this variation, a supplementary annular air evacuating groove 60 is in communication with the chamber 34 by means of a plurality of passageways 61 only one of which is illustrated. The groove 60 is positioned so as to surround the outer container sidewall surface at a place therealong that is closely adjacent the circumferential interior juncture of the container side wall and bottom panel. Also in the FIG. 4 showing, it will be observed that the knock-out pad 18 of FIGS. 1-3 has been replaced by a projection 62 on the bottom of the die cavity of similar size and shape. Container ejection is achieved by means of a blast of compressed air supplied from a source 63. The air blast is directed through a bore 64 against the bottom wall 23 of the container 15 to eject the container from the die cavity. A conduit 65 having a control valve 66 therein supplies the compressed air from the source 63 to the bore 64. It will be noticed in FIG. 4 that air is not only evacuated through the bores 33 as before but also through the air permeable container side wall into the groove 60 and then through the passageways 61 into the chamber 34. This additional air evacuating path results in very rapid air evacuation when high speed operation is of primary importance. It is feasible to employ the groove 60 alone and dispense with the bores 33 to the chamber 32 as another alternative.

Figure 5:
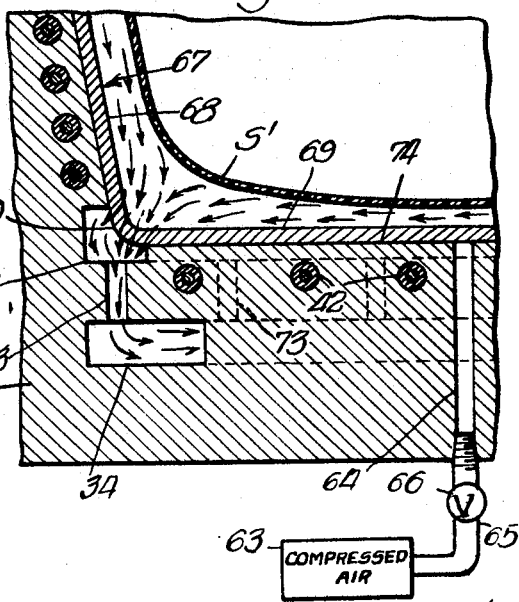

In FIG. 5 is shown a variation of the die cavity portion 11 when it is desired to line a cup shaped container that is molded in one piece from porous material such as cellulose pulp. Such a container is indicated generally at 67 and has a tapered side wall portion 68 and a flat bottom panel or wall portion 69 integrally joined at a corner junction 70. An annular air evacuation groove 72 is positioned in the lower die cavity forming portion 11 so as to surround the corner junction 70. A plurality of bores 73 connect the groove 72 with the chamber 34 and air is evacuated through the chamber 34 as previously explained. The container 67 after being lined is ejected in the same manner as described in the explanation of FIG. 4. It is to be noted that the bottom of the cavity indicated at 74 in this instance is not shaped into a projection as indicated at 62 in FIG. 4 since the bottom panel 69 is not recessed within a hook seam such as the hook seam 31.

It is to be understood that other variations within the scope of the invention will occur to one skilled in the art in addition to the variations illustrated and described herein. As an example; referring to FIG. 1, it will be apparent that the vent bores 13 in the upper vertically reciprocatable die member 12 instead of being vented to the atmosphere could be connected to a source of compressed air by suitable conduits, with the air flow being controlled by a suitable valve. During operation of the apparatus, the compressed air would be directed above the film S to create a greater differential air pressure across the film than can be achieved by the vacuum source 37 with atmospheric air pressure above the film. This would tend to increase the speed of the lining operation but the feasibility of this variation has not as yet been extensively investigated.

As a still further example, a film of very thin and easily stretchable lining material might be employed that would not require pre-heating before the drawing operation. Such a film might also have a pressure sensitive or solvent type adhesive coating on the side facing the interior of the container so as to also eliminate the heat necessary for effecting a heat seal bond between the film and container walls.

In view of the many variations by which the invention may be carried out, the scope of the invention is intended to be as set forth in the following claims rather than being limited to only the example preferred method steps or to the details of the illustrated embodiments.

What is claimed is:

1. In a method of lining a container that includes a rim defining a mouth opening; a body wall forming portion fabricated from air permeable material coated on the exterior side with an air impermeable coating and having a bottom terminal edge uncoated; a bottom panel of air permeable material coated on the exterior side with an air impermeable coating; said bottom panel having a circumferential downwardly bent flange portion and said body wall forming portion having an inwardly and upwardly bent hook flange encompassing said bottom panel flange with said flanges and contiguous body wall portion being bonded together with an air permeable adhesive so as to form a hook seam having said bottom terminal edge of the body wall portion facing upwardly toward the bottom panel and slightly spaced therefrom; the steps comprising: supporting substantially the entire outer wall surface of the container against deflection with the exception of a narrow annular unsupported surface in the vicinity of the inwardly and upwardly turned uncoated bottom terminal edge of the body wall portion; applying a deformable film of lining material across the mouth rim of the container in substantially air tight relationship and then evacuating the air from the interior of the container through the upwardly and inwardly bent uncoated terminal edge of the body wall portion and additionally through said air permeable adhesive bonding said flanges together to effect the drawing of the film into adhering contact with the interior container wall surfaces.

2. A method as set forth in claim 1 including the additional step of heating the film lining material to render it more easily deformable before evacuating the air from the interior of the container.

3. A method as set forth in claim 2 including the additional step of heating wall portions of the container to effect the adherence of the film thereto.

4. A method as set forth in claim 1 further characterized in that the step of applying a deformable film of lining material across the mouth rim of he container comprises: mechanically pressing and forming the film into substantially air tight adhering contact with the rim to cover the rim with film.

References Cited
UNITED STATES PATENTS

| | | |
|---|---|---|
| 1,684,658 | 9/1928 | Beardsley. |
| 2,032,343 | 3/1936 | Arthur _____ 93—36 |
| 2,259,256 | 10/1941 | Maas _____ 93—55.1 |
| 2,328,798 | 9/1943 | Gardner _____ 93—36.01 X |
| 2,699,274 | 1/1955 | De Villers. |
| 2,736,065 | 2/1956 | Wilcox _____ 93—36.01 X |
| 3,195,425 | 7/1965 | Taggart _____ 93—36.01 |
| 3,266,390 | 8/1966 | Carpenter _____ 93—36.01 |
| 3,318,748 | 5/1967 | Hurst. |

WILLIAM W. DYER, JR., *Primary Examiner.*

WAYNE A. MORSE, JR., *Examiner.*